United States Patent
Sugita (10) Patent No.: US 9,268,118 B2
(45) Date of Patent: Feb. 23, 2016

(54) ZOOM LENS AND IMAGE-PICKUP APPARATUS

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 14/062,989

(22) Filed: Oct. 25, 2013

(65) Prior Publication Data

US 2014/0118839 A1    May 1, 2014

(30) Foreign Application Priority Data

Oct. 30, 2012  (JP) ................................. 2012-238823

(51) Int. Cl.
*G02B 15/14* (2006.01)
*G02B 15/173* (2006.01)
*G02B 13/00* (2006.01)

(52) U.S. Cl.
CPC ............ *G02B 15/173* (2013.01); *G02B 13/009* (2013.01); *G02B 15/14* (2013.01)

(58) Field of Classification Search
CPC ...... G02B 13/009; G02B 15/14; G02B 15/15; G02B 15/16; G02B 15/163; G02B 15/167; G02B 15/20; G02B 15/22; G02B 15/24
USPC .......................................... 359/676, 680–683
See application file for complete search history.

(56) References Cited

U.S. PATENT DOCUMENTS

| | | | |
|---|---|---|---|
| 6,556,356 B2 | 4/2003 | Ohtake | |
| 7,126,758 B2 * | 10/2006 | Fujimoto et al. | 359/676 |
| 8,064,145 B2 * | 11/2011 | Yasui | 359/691 |
| 8,243,170 B2 | 8/2012 | Miyazaki et al. | |
| 8,472,123 B2 | 6/2013 | Miyazaki et al. | |
| 2011/0242675 A1 * | 10/2011 | Sugita | 359/676 |
| 2013/0235466 A1 * | 9/2013 | Iwamoto | 359/683 |
| 2014/0009832 A1 * | 1/2014 | Sugita | 359/557 |

FOREIGN PATENT DOCUMENTS

| | | | |
|---|---|---|---|
| JP | 2001-033697 A | 2/2001 | |
| JP | 2002-107628 A | 4/2002 | |
| JP | 2004-317867 A | 11/2004 | |
| JP | 2009-251114 A | 10/2009 | |
| JP | 2009-251117 A | 10/2009 | |

* cited by examiner

*Primary Examiner* — Scott J Sugarman
*Assistant Examiner* — Gary O'Neill
(74) *Attorney, Agent, or Firm* — Carter, DeLuca, Farrell & Schmidt, LLP (57) ABSTRACT

A zoom lens includes, in order from an object side to an image side, a first, a second, a third, a fourth, a fifth, a sixth and a seventh lens units respectively having positive, negative, positive, negative, positive, negative and positive refractive powers. A distance between adjacent lens units change during zooming so that a distance between the fourth lens unit and the fifth lens unit at a telephoto end is shorter than the distance at a wide angle end and a distance between the fifth lens unit and the sixth lens unit at the telephoto end is longer than the distance at the wide angle end. And the fourth lens unit moves during focusing.

16 Claims, 10 Drawing Sheets

ZOOM LENS AND IMAGE-PICKUP APPARATUS

BACKGROUND OF THE INVENTION

1. Field of the Invention

The present invention relates to a zoom lens and an image pickup apparatus including the same suitable for an image pickup optical system, for example, such as a digital still camera, a digital video camera, a TV camera and a security camera, a broadcast camera.

2. Description of the Related Art

A zoom lens which has a high zoom ratio and is capable of performing high speed and high accuracy autofocus is required for an image pickup optical system used for an image pickup apparatus.

A positive lead type zoom lens which includes a lens unit having a positive refractive power on the most object side is known as a zoom lens having a high zoom ratio. Additionally, a rear focus type zoom lens which focuses by moving lens units except for a lens unit arranged on the most object side is known as a zoom lens easily performing high speed autofocus.

Additionally, recently, a single lens reflex camera is required for having a video recording function and performing autofocus during recording a video. A contrast system evaluating focusing state of an image pickup optical system by detecting high frequency component in an image pickup signal is widely used as an autofocus system during recording a video.

An image pickup apparatus using a contrast system detects a displacement direction from focusing state by vibrating a focus lens unit in an optical axis direction at high speed (hereinafter referred to as "wobbling"). And after wobbling, an optimum position of the focus lens unit becoming focusing state is calculated by detecting signal component of a specific frequency band of an image region from an output signal of an image pickup sensor. Then, the focus lens unit is moved to the optimum position so as to complete focusing. It is desirable that the focus lens unit is small and light so as to operate the focus lens unit at wobbling.

It is good for zoom lens having a high zoom ratio to contrive miniaturization and weight reduction of the lens by reducing the number of the lenses so as to perform high speed autofocus. However, when the number of the focus lens unit is easily reduced, aberration variation generated by focusing is larger. Therefore, it is important to properly select a zoom type and a focus lens unit in order to achieve high speed focus easily, make aberration variation smaller when focusing and acquire high optical performance in general object distance.

It is important to properly set transfer condition according to zooming of a plurality of lens units so as to acquire a high zoom ratio and miniaturization of an entire system simultaneously. Additionally, it is important to properly set imaging magnification of the focus lens unit and a refractive power arrangement of a lens unit at an object side and a lens unit at an image side in the focus lens unit so as to make aberration variation according to focusing smaller and acquire high optical performance in general object distance.

U.S. Pat. No. 6,556,356 discloses a zoom lens which includes, in order from an object side to an image side, a first lens unit having a positive refractive power, a second lens unit having a negative refractive power, a third lens unit having a positive refractive power and a fourth lens unit having a positive refractive power, and moves the second lens unit during focusing.

In U.S. Pat. No. 6,556,356, a movement amount during focusing becomes smaller by performing focusing of the second lens unit having strong negative refractive power, but since the lens unit is comparatively large size, the focusing speed is prone to be slow and a wobbling operation corresponding to a video is hard.

Japanese Patent Laid-Open No. 2001-033697 discloses a zoom lens which includes, in order from an object side to an image side, a first lens unit having a positive refractive power, a second lens unit having a negative refractive power, a third lens unit having a positive refractive power, a fourth lens unit having a negative refractive power and a fifth lens unit having a positive refractive power, and moves the fourth lens unit during focusing.

In Japanese Patent Laid-Open No. 2001-033697, achievement of a small and light focus lens unit is contrived by performing focusing of the fourth lens unit, but optical performance is prone to change during zooming and focusing.

U.S. Pat. No. 8,472,123 discloses a zoom lens which includes, in order from an object side to an image side, a first lens unit having a positive refractive power, a second lens unit having a negative refractive power, a third lens unit having a negative refractive power, a fourth lens unit having a positive refractive power and a fifth lens unit having a positive refractive power, and moves the third lens unit during focusing.

U.S. Pat. No. 8,243,170 discloses a zoom lens which includes, in order from an object side to an image side, a first lens unit having a positive refractive power, a second lens unit having a negative refractive power, a third lens unit having a positive refractive power, a fourth lens unit having a positive refractive power and a fifth lens unit having a positive refractive power, and moves the third lens unit during focusing.

In the focus lens unit comprising a small number of the lenses in U.S. Pat. Nos. 8,472,123 and 8,243,170, when the power of the focus lens unit is strong, residual aberration of the focus lens unit and aberration variation by the object distance is larger. When the refractive power of the focus lens unit is weak, the entire system is prone to grow in size since the movement amount is larger during focusing.

Japanese Patent Laid-Open No. 2004-317867 discloses a zoom lens which includes, in order from an object side to an image side, a first lens unit having a positive refractive power, a second lens unit having a negative refractive power, a third lens unit having a positive refractive power, a fourth lens unit having a negative refractive power, a fifth lens unit having a positive refractive power, a sixth lens having a negative refractive power and a seventh lens having a positive refractive power, and moves the sixth lens unit during focusing.

In Japanese Patent Laid-Open No. 2001-033697, the negative refractive power of the sixth lens unit comparatively arranged on the image side is stronger and an enough moving space for focusing is prepared so as to make the focus sensitivity larger. Therefore, it is difficult to become a refractive power arrangement of a retrofocus type at a wide angle and contrive a wide angle of view.

SUMMARY OF THE INVENTION

The present invention provides a zoom lens which has a wide angle of view and a high zoom ratio and is capable of easily performing high speed focusing.

A zoom lens as one as aspect of the present invention includes, in order from an object side to an image side, a first lens unit having a positive refractive power, a second lens unit having a negative refractive power, a third lens unit having a positive refractive power, a fourth lens unit having a negative refractive power, a fifth lens unit having a positive refractive power, a sixth lens unit having a negative refractive power and a seventh lens unit having a positive refractive power. A distance between adjacent lens units changes during zooming so that a distance between the fourth lens unit and the fifth lens unit at a telephoto end is shorter than the distance at a wide angle end and a distance between the fifth lens unit and the sixth lens unit at the telephoto end is longer than the distance at the wide angle end. The fourth lens unit moves during focusing.

A zoom lens as another aspect of the present invention includes, in order from an object side to an image side, a first lens unit having a positive refractive power, a second lens unit having a negative refractive power, a third lens unit having a positive refractive power, a fourth lens unit having a negative refractive power, a fifth lens unit having a positive refractive power, a sixth lens unit having a negative refractive power and a seventh lens unit having a positive refractive power. The third lens unit, the fifth lens unit and the seventh lens unit move along the same locus during zooming so as to change a distance between adjacent lens units. The following conditions are satisfied:

$$0.2 < f5/f3 < 0.8$$

$$0.02 < f5/f7 < 0.30$$

where f3 represents a focal length of the third lens unit, f5 is a focal length of the fifth length unit and f7 represents a focal length of the seventh lens unit.

Further features of the present invention will become apparent from the following description of exemplary embodiments with reference to the attached drawings.

DESCRIPTION OF THE EMBODIMENTS

A detailed description will be given of an embodiment of the present invention with reference to be the accompanying drawings. A zoom lens of the present invention comprises, in order from an object side to an image side, a first, a second, a third, a fourth, a fifth, a sixth and a seventh respectively having a positive, a negative, a positive, a negative, a positive, a negative, and a positive refractive power. A distance between adjacent lens units change during zooming so that a distance between the fourth lens unit and the fifth lens unit at a telephoto end (a long focal length end) is shorter than the distance at a wide angle end (a single focal length end) and a distance between the fifth lens unit and the sixth lens unit at the telephoto end is longer than the distance at the wide angle end. The fourth lens unit moves during focusing.

Figure 1:
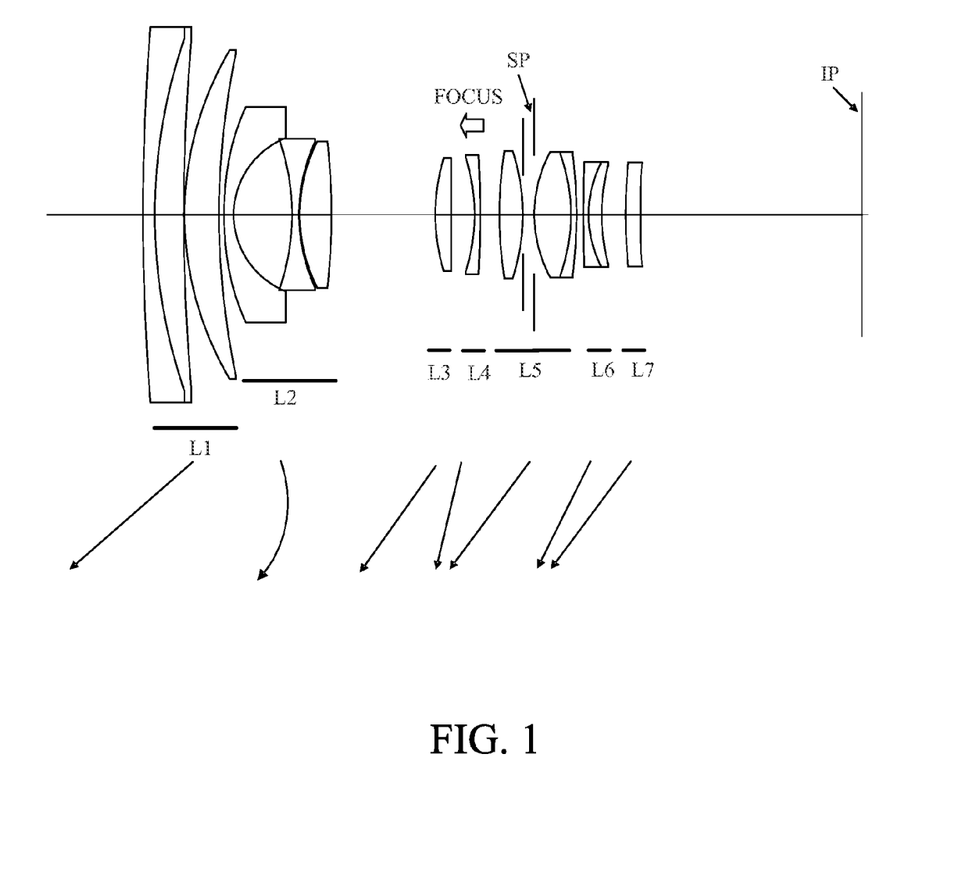
FIG. 1 is a sectional view of a zoom lens according to a first embodiment of the present invention.
Figure 2A:
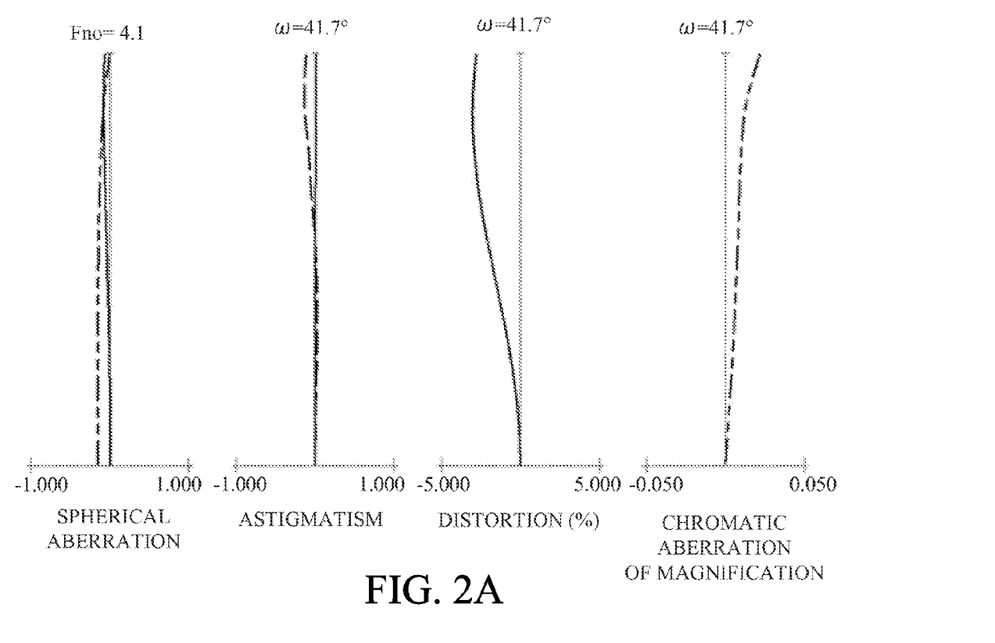
FIGS. 2A and 2B are aberration diagrams at a wide angle end and a telephoto end when the zoom lens according to the first embodiment is focused on an object at infinity.
Figure 2B:
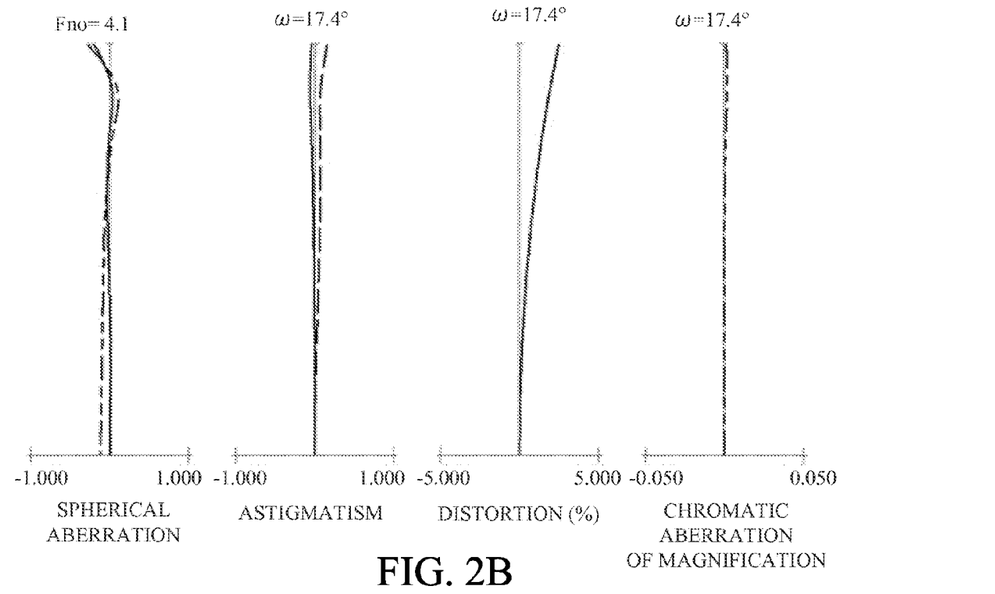
Figure 3A:
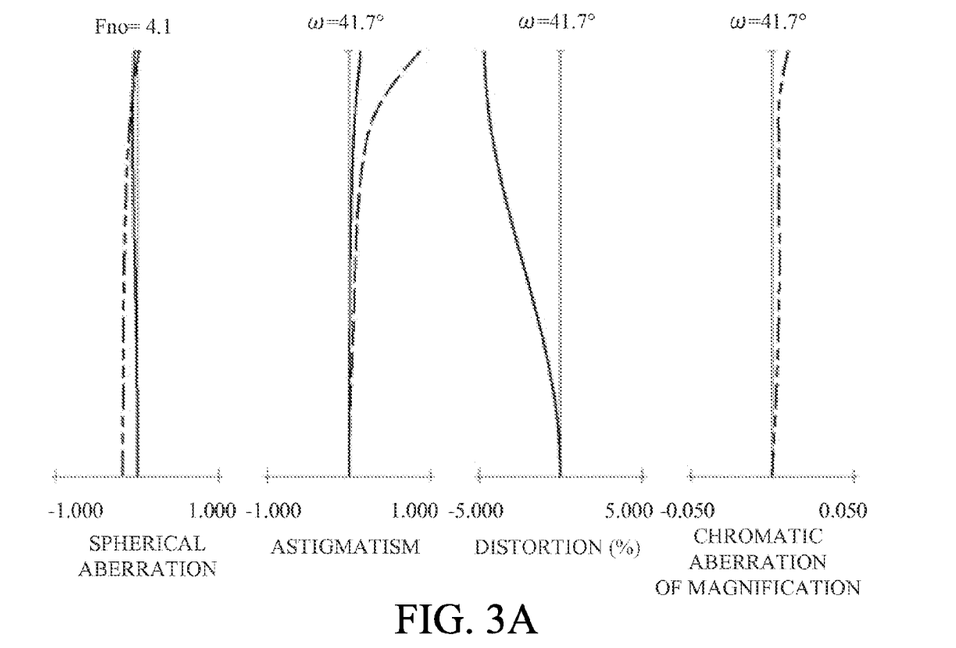
FIGS. 3A and 3B are aberration diagrams at a wide angle end and a telephoto end when the zoom lens according to the first embodiment is focused on a close distance object.
Figure 3B:
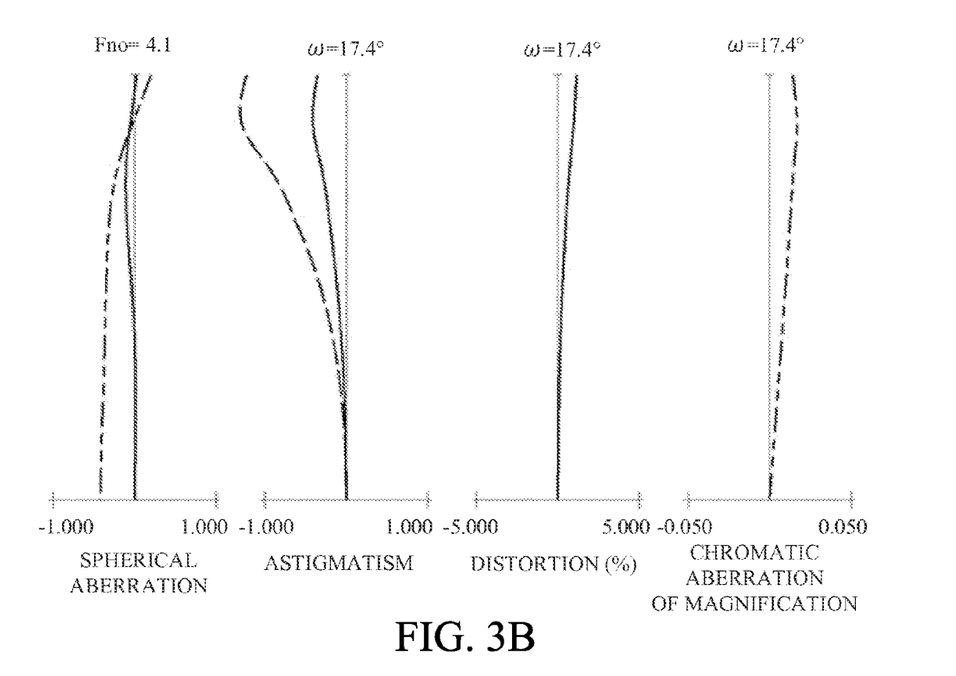

FIG. 1 is a sectional view at a wide angle end of a zoom lens according to a first embodiment of the present invention. FIGS. 2A and 2B are aberration diagrams at a wide angle end and a telephoto end (a long focal length end) when the zoom lens according to the first embodiment is focused on an object at infinity. FIGS. 3A and 3B are aberration diagrams at a wide angle end and a telephoto end when the zoom lens according to the first embodiment is focused on a close distance object (an object distance of 420 mm) (The object distance of 420 mm is a value of a numerical example described below represented by unit "mm". The same applies to the following).

Figure 4:
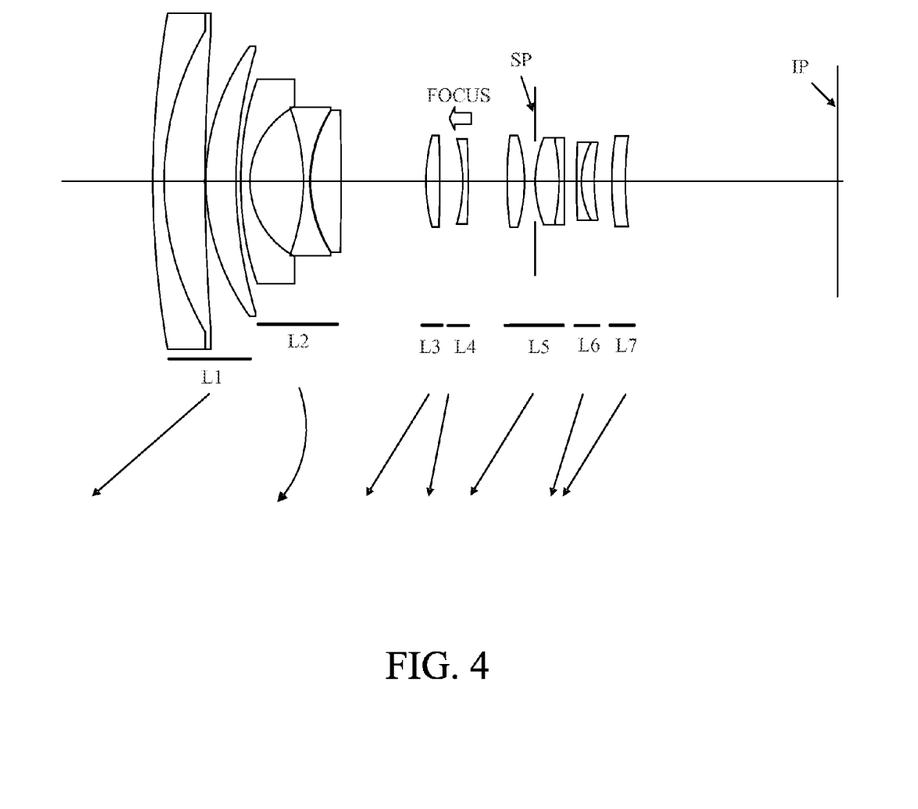
FIG. 4 is a sectional view of a zoom lens according to a second embodiment of the present invention.
Figure 5A:
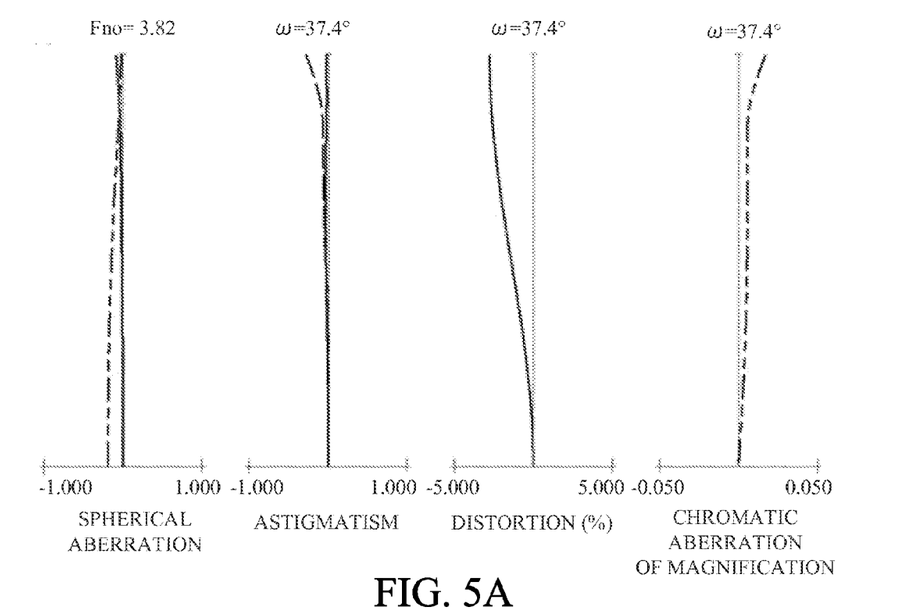
FIGS. 5A and 5B are aberration diagrams at a wide angle end and a telephoto end when the zoom lens according to the second embodiment is focused on an object at infinity.
Figure 5B:
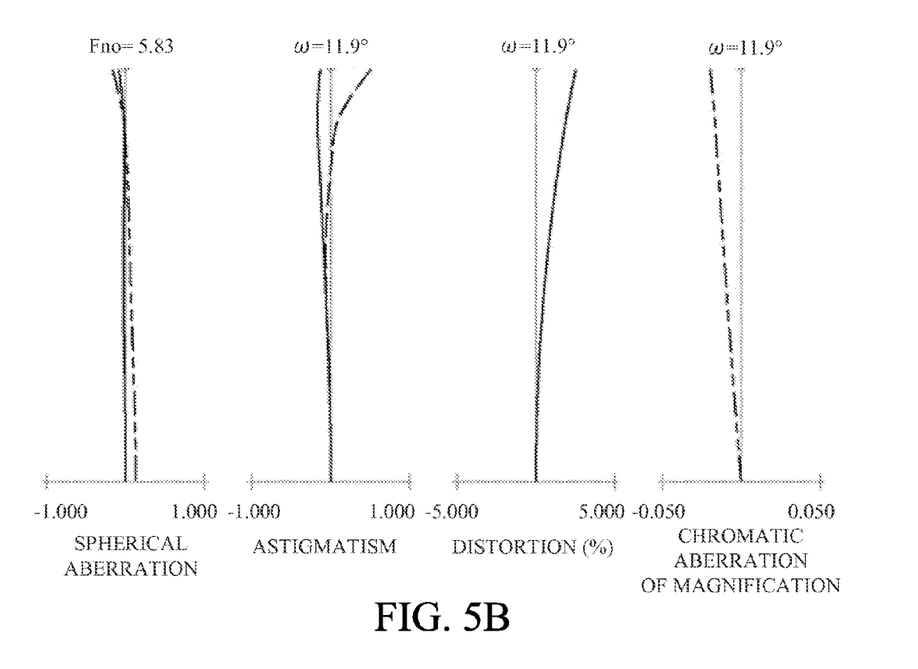
Figure 6A:
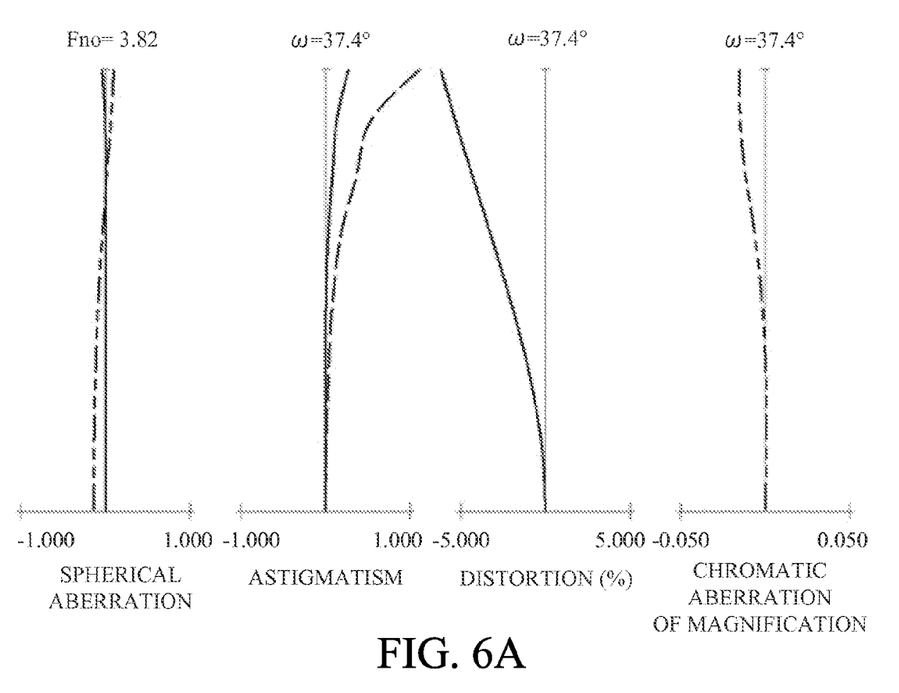
FIGS. 6A and 6B are aberration diagrams at a wide angle end and a telephoto end when the zoom lens according to the second embodiment is focused on a close distance object.
Figure 6B:
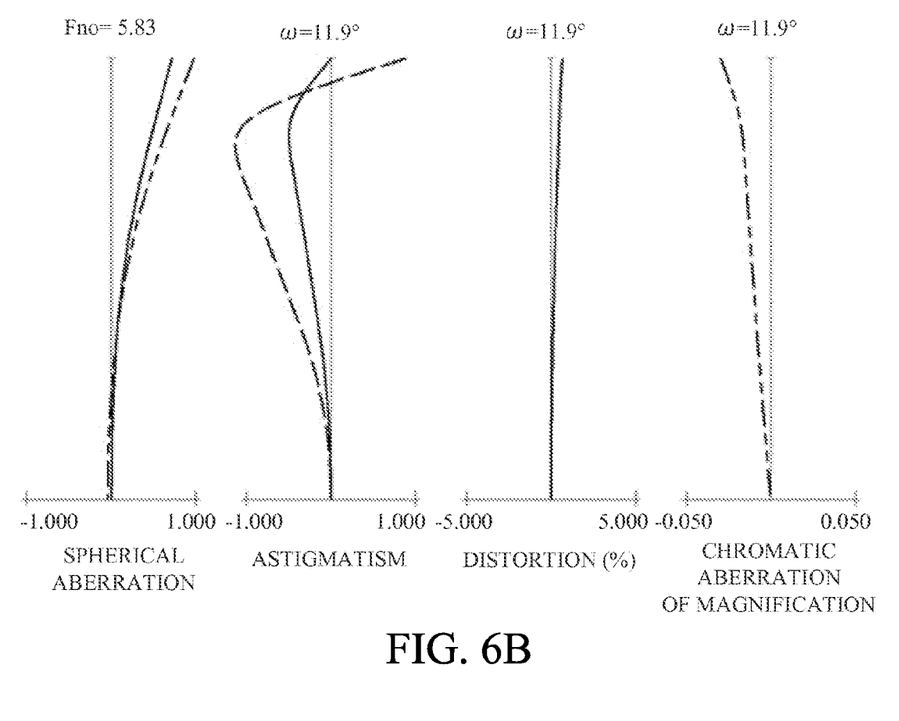

FIG. 4 is a sectional view at a wide angle end of a zoom lens according to a second embodiment of the present invention. FIGS. 5A and 5B are aberration diagrams at a wide angle end and a telephoto end (a long focal length end) when the zoom lens according to the second embodiment is focused on an object at infinity. FIGS. 6A and 6B are aberration diagrams at a wide angle end and a telephoto end when the zoom lens according to the second embodiment is focused on a close distance object (an object distance of 420 mm).

Figure 7:
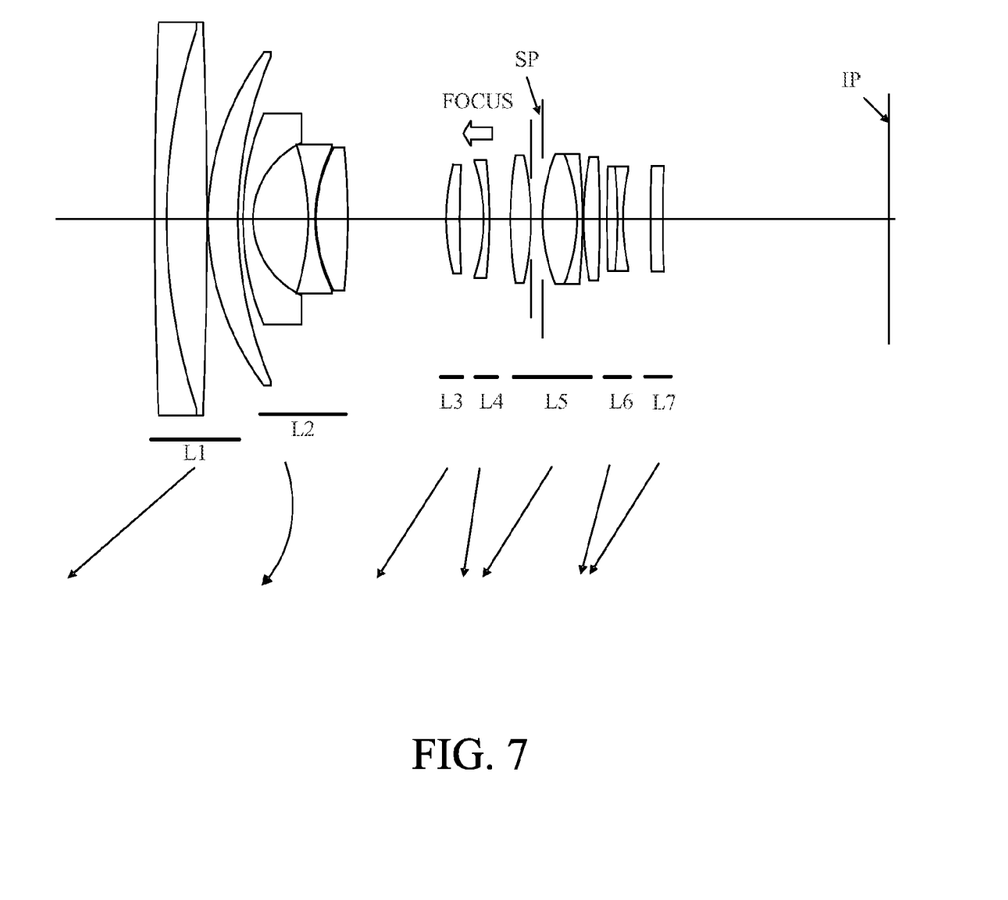
FIG. 7 is a sectional view of a zoom lens according to a third embodiment of the present invention.
Figure 8A:
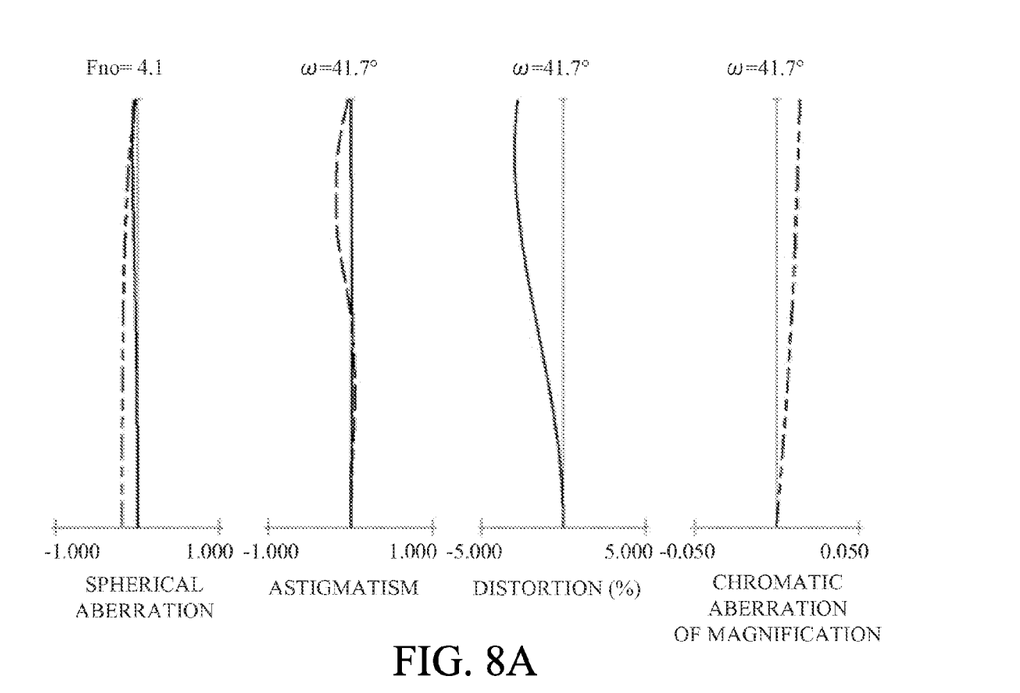
FIGS. 8A and 8B are aberration diagrams at a wide angle end and a telephoto end when the zoom lens according to the third embodiment is focused on an object at infinity.
Figure 8B:
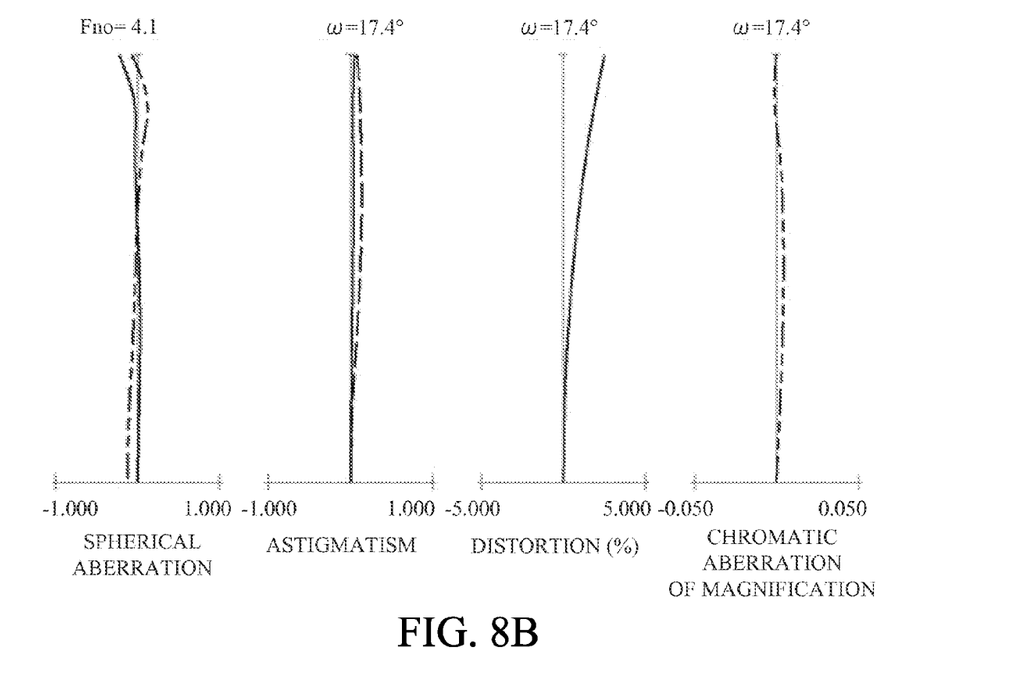
Figure 9A:
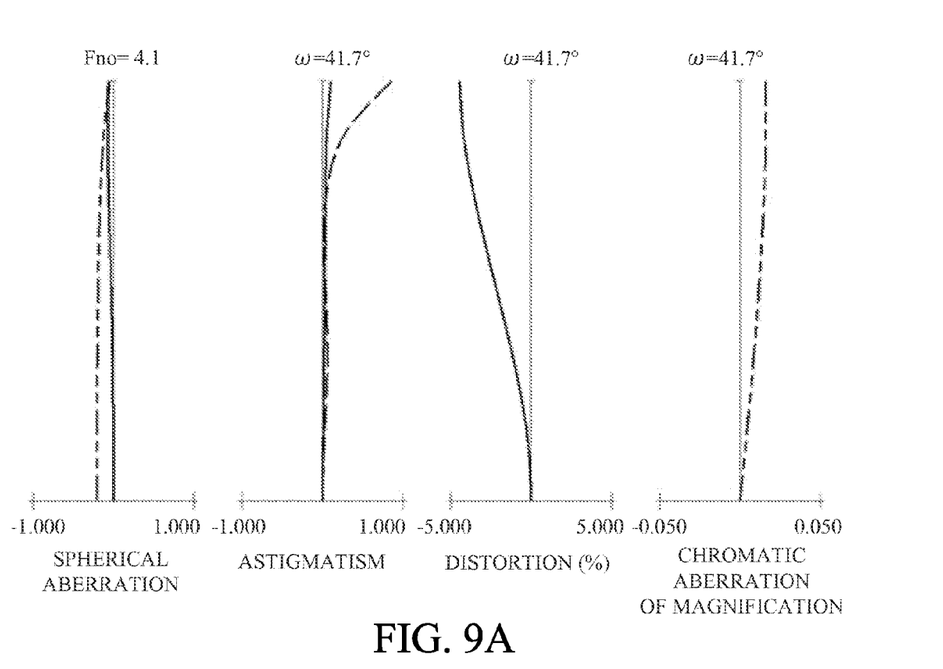
FIGS. 9A and 9B are aberration diagrams at a wide angle end and a telephoto end when the zoom lens according to the third embodiment is focused on a close distance object.
Figure 9B:
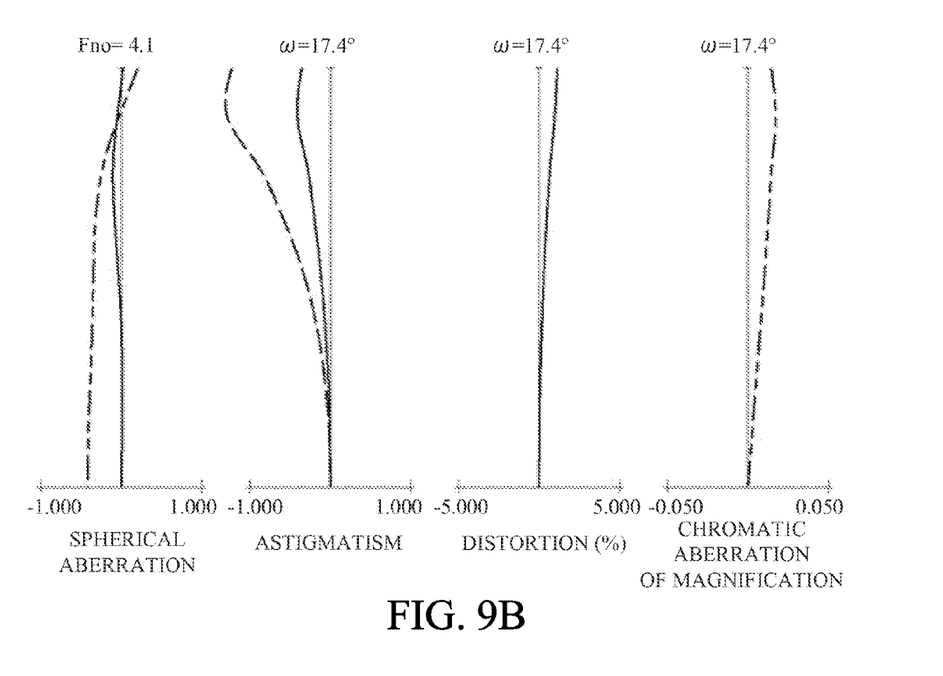

FIG. 7 is a sectional view at a wide angle end of a zoom lens according to a third embodiment of the present invention. FIGS. 8A and 8B are aberration diagrams at a wide angle end and a telephoto end (a long focal length end) when the zoom lens according to the third embodiment is focused on an object at infinity. FIGS. 9A and 9B are aberration diagrams at a wide angle end and a telephoto end when the zoom lens according to the third embodiment is focused on a close distance object (an object distance of 420 mm).

Figure 10:
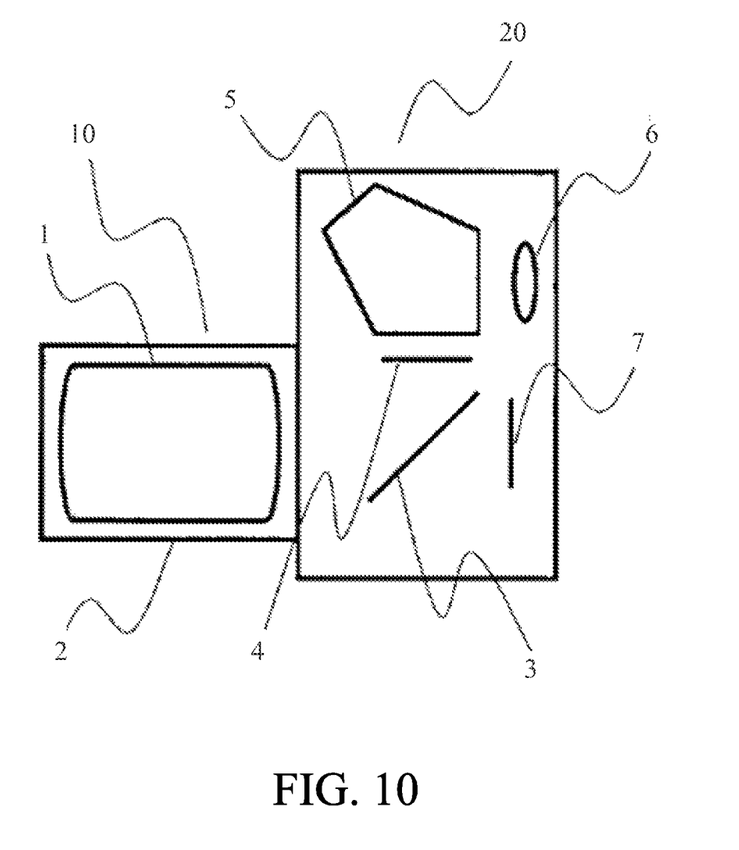
FIG. 10 is a schematic diagram of a main part of an image pickup apparatus of the present invention.

FIG. 10 is a schematic diagram of a main part of a single lens reflex camera (an image pickup apparatus) having a zoom lens of the present invention.

The zoom lens of each embodiment is an image pickup optical system (an optical system) used for an image pickup apparatus such as a video camera, a digital camera and a silver-halide film camera. In the sectional view of the lens, the left side is an object side (forward) and the right side is an image side (a rear side). In the sectional view of the lens, i denotes an order of the zoom lens unit from the object side and Li denotes an i-th lens unit.

L1 denotes a first lens unit having a positive refractive power, L2 denotes a second lens unit having a negative refractive power, L3 denotes a third lens unit having a positive refractive power, L4 denotes a fourth lens unit having a negative refractive power, L5 denotes a fifth lens unit having a positive refractive power, L6 denotes a sixth lens unit having a negative refractive power and L7 denotes a seventh lens unit having a positive refractive power.

SP denotes an aperture stop. IP denotes an image plane, and corresponds to an image pickup plane of a solid image pickup element (a photoelectric conversion element) such as a CCD sensor and a CMOS sensor when using as an image-pickup optical system of a video camera and a digital camera, or a film plane when using as a silver-halide film camera. The arrow illustrates a movement locus during zooming from the wide angle end to the telephoto end.

The first lens unit L1, the third lens unit L3 and the seventh lens unit L7 move to the object side and the second lens unit L2 moves to the image side along a locus concave during zooming from the wide angle end to the telephoto end.

In particular, each lens unit moves during zooming so that a distance between the first lens unit and the second lens unit at the telephoto end is longer than the distance at the wide angle end, a distance between the second lens unit and the third lens unit at the telephoto end is shorter than the distance at the wide angle end, a distance between the third lens unit and the fourth lens unit at the telephoto end is longer than the distance at the wide angle end, a distance between the fourth lens unit and the fifth lens unit at the telephoto end is shorter than the distance at the wide angle end, a distance between the fifth lens unit and the sixth lens unit at the telephoto end is longer than the distance at the wide angle end and a distance between the sixth lens unit and the seventh lens unit at the telephoto end is shorter than the distance at the wide angle end. The fourth lens unit L4 moves to the object side during focusing from the object at infinity to the close distance object.

In a spherical aberration diagrams, a solid line represents d-line (a wavelength of 587.7 nm) and a broken line represents g-line (a wavelength of 435.8 nm). In an astigmatism diagram, a broken line represents meridional image surface ΔM of d-line and a solid line represents sagittal image surface ΔS of d-line. Additionally, in a diagram illustrating distortion, distortion of d-line is illustrated. In a diagram illustrating chromatic aberration of magnification, chromatic aberration of magnification of g-line is illustrated. Fno denotes f-number and ω denotes an image pickup half angle of view (degrees). In the following embodiments, the wide angle end and the telephoto end are both ends of a range where the variable magnification lens unit is capable of moving on an optical axis in a system.

The feature of the zoom lens of the present invention is explained compared with the zoom lens of each patent literature as described above.

In the zoom lens described in U.S. Pat. No. 6,556,356, an axial light incident to the second lens at the telephoto end is higher than an axial light at the wide angle end since the second lens unit performs focusing. Therefore, the focal length becomes short at the wide angle end when focusing on a close distance object and the zoom ratio focusing on the close distance object is smaller than the zoom ratio focusing on an object at infinity.

Additionally, in general, magnification of the zoom lens is able to become the largest when focusing on a close distance object at a wide angle end. However, in U.S. Pat. No. 6,556,356, maximum magnification of the zoom lens becomes small since an angle of view becomes large when focusing on the close distance object at the wide angle end.

In the zoom lens disclosed in Japanese Patent Laid-Open No. 2001-033697, an axial light becomes a convergent light and an incident height of an off-axis principal light becomes high on the image side of the third lens unit, and the fourth lens unit for focusing is arranged on there. Therefore, aberration variation by focusing is easily large. Additionally, since the third lens unit has strong positive refractive power and composite refractive power of the fourth lens unit having the negative refractive power and the fifth lens unit having the positive refractive lens is almost zero, a principal point of composite refractive power of the third, the fourth and the fifth positions apart from the image plane. Therefore, a refractive power arrangement of a retrofocus lens becomes weak and, as a result, the wide angle of view has a tendency to become difficult.

In the zoom lens of U.S. Pat. No. 8,243,170, when movement amount during focusing is suppressed by enhancing the refractive power of the third lens unit being the focus lens unit, front side principal position of composite system of the second lens unit and the third lens unit moves to the third lens unit side. Therefore, a refractive power arrangement is the same opening a distance between the first lens unit and the second lens unit at the wide angle end of the fourth lens unit comprising lens units respectively having a positive, a negative, a positive and a positive refractive power, and, as a result, the wide angle view becomes difficult.

The zoom lens having five lens units disclosed in U.S. Pat. No. 8,243,170 tries to make movement amount when focusing small by enhancing the refractive power of the third lens unit being the focus lens unit. Therefore, rear side principal position of the lens unit having a positive refractive power composite of the third lens unit and the fourth lens unit which is adjacent to the third lens unit and has the positive refractive power moves to the third lens unit side, and as a result, it is difficult to acquire a back focus having a predetermined length at the wide angle end.

In the zoom lens having seven lens units disclosed in Japanese Patent Laid-Open No. 2004-317867, the sixth lens unit having the negative refractive power moves when focusing, but a space between the fifth lens unit and the sixth lens unit is not afocal system and, as a result, aberration variation is prone to be large.

Therefore, the zoom lens according to one embodiment of the present invention makes the image side of the third lens unit of the seven groups zoom lens which, in order from the object side to the image side, the first lens unit through the seventh lens unit respectively having the positive, the negative, the positive, the negative, the positive, the negative and the positive refractive power afocal system. And the small and light fourth lens unit L4 performs focusing. Additionally, each lens unit moves so that the distance between the fourth lens unit L4 and the fifth lens unit L5 at the telephoto end is smaller than the distance at the wide angle and the distance between the fifth lens unit L5 and the sixth lens unit L6 at the telephoto end is larger than the distance at the wide angle end.

This zooming system corresponds to the configuration inserting lens units respectively having a positive and a negative refractive power between the second lens unit and the third lens unit in the zoom lens having five lens units comprising the first, the second, the third, the fourth and the fifth lens unit respectively having the positive, the negative, the positive, the negative and the positive refractive power described in Japanese Patent Laid-Open No. 2001-033697. Then, composite refractive power is almost zero the inserting lens unit. Since a distance between the first lens unit L1 widely contributing to magnification and the second lens unit L2 does not change during focusing, both magnification ratio on the close distance object side and maximum magnification can be avoided from being small.

Additionally, when both refractive powers of the fourth lens unit L4 and the third lens unit L3 become large, the focusing movement amounts of the fourth lens unit L4 during focusing become small and the entire system becomes small. Moreover, since the image side of the third lens unit L3 is afocal system, change of an incident height of an axial light during focusing becomes small, and variations of axial aberrations by changing an object distance such as spherical aberration and axial chromatic aberration becomes small.

Additionally, since the image side of the third lens unit L3 is afocal system, emitting light emitted from the fourth lens unit having the negative refractive power becomes divergent light and a refractive power of composite system of the fifth lens unit L5 through the seventh lens unit L7 is strong positive refractive power so as to converge the above divergent light. Therefore, a refractive power arrangement of a retrofocus lens is easily formed, and wide angle of view and small entire system is contrived.

Additionally, the fourth lens unit L4 is arranged on a position between the second lens unit having the negative refractive power and composite system having the positive refractive power of the fifth lens unit L5 through the seventh lens unit L7 where incident height of an off-axis principal light is comparatively small. Therefore, an off-axis aberration such as field curvature and chromatic aberration of magnification becomes small even if object distance changes.

After the fifth lens unit L5, the same applies to the feature of the fifth zoom lens discussed above. In other words, magnification effect is acquired since each lens unit moves during zooming so that a distance between the fifth lens unit L5 and the sixth lens unit L6 at the telephoto end is larger than a distance at the wide angle end and a distance between the sixth lens unit L6 and the seventh lens unit L7 at the telephoto end is smaller than a distance at the wide angle. Therefore, extension amount of the first lens unit L1 during zooming can be small and, as a result, small entire system is contrived.

Thus, the present invention acquires a zoom lens which has small and light focus mechanism, has preferable optical performance at all object distance in entire zoom region and is small of the entire system.

In each embodiment, it is further preferred that one of the following conditions is satisfied. ft represents focal length of the entire system at the telephoto end. $f_{1-3}t$ represents a focal length at the telephoto end of a composite system from the first lens unit L1 to the third lens unit L3. fw represents a focal length of the entire system at the wide angle end. $f_{1-3}w$ represents a focal length at the wide angle end of the composite system from the first lens unit L1 to the third lens unit L3. β4w represents a lateral magnification of the fourth lens unit L4 at the wide angle end. β4t represents a lateral magnification of the fourth lens unit L4 at the telephoto end.

$f_{1-2}w$ represents a focal length at the wide angle end of a composite system of the first lens unit L1 and the second lens unit L2. $f_{1-2}t$ represents a focal length at the telephoto end of a composite system of the first lens unit L1 and the second lens unit L2. Mft represents a movement amount of the fourth lens unit L4 when focusing from the object at infinity to the close distance object at the telephoto end, and Mz represents a variation amount of a distance between the third lens unit L3 and the fourth lens unit L4 when zooming from the wide angle end to the telephoto end. Here, the movement amount from the object side to the image side is defined as positive.

The third lens unit L3, the fifth lens unit L5, and the seventh lens unit L7 move along the same locus during zooming, and f3, f5, f7 represent a focal length of the third lens unit L3, the a focal length of the fifth lens unit L5, and a focal length of the seventh lens unit L7, respectively. Then, it is preferred that one or more of the following conditions is satisfied:

$$|ft/f_{1-3}t|<0.9 \quad (1)$$

$$|fw/f_{1-3}w|<0.6 \quad (2)$$

$$|β4w|<1.0 \quad (3)$$

$$|β4t|<1.0 \quad (4)$$

$$0.3<-f_{1-2}w/f3<2.0 \quad (5)$$

$$0.3<-f_{1-2}t/f3<2.0 \quad (6)$$

$$0.5<-Mz/Mft<1.3 \quad (7)$$

$$0.2<f5/f3<0.8 \quad (8)$$

$$0.02<f5/f7<0.30 \quad (9)$$

Next, technical meaning of each condition described above is explained.

The condition (1) prescribes a focal length at the telephoto end of a composite system from the first lens unit L1 to the third lens unit L3. By satisfying the condition (1), the image side of the third lens unit L3 can become afocal, variation of the incident height of the axial light in the case of focusing by the fourth lens unit L4 can become small and variation of the axial aberration in the case of changing the object distance can become small. Additionally, the fourth lens unit L4 is arranged on the position between the second lens unit L2 and the fifth lens unit L5 where the incident height of the off-axis principal light is comparatively small so as to make the off-axis aberration small.

When left member of the condition (1) deviates to a positive direction, a positive refractive power from the first lens unit L1 to the third lens unit L3 becomes strong and the image side of the third lens unit L3 becomes convergent light similar to Japanese Patent Laid-Open No. 2001-033697. Therefore, variation of the incident height of the off-axis light of the fourth lens unit L4 by changing the object distance becomes large. In addition, since convergent refractive power has already been acquired from the first lens unit L1 to the third lens unit L3, a refractive power of composite system having a positive refractive power after the fifth lens unit L5 cannot enhance, the refractive power arrangement of a retrofocus lens collapses, and wide angle of view and small entire system is difficult.

When left member of the condition (1) deviates to a negative direction, a negative refractive power of composite system from the first lens unit L1 to the third lens unit L3 becomes strong and the image side of the third lens unit L3 becomes divergent light. Therefore, a refractive power of the fourth lens unit L4 cannot enhance, focus movement amount of the fourth lens unit L4 increases and the entire system grow in size. It is further preferred that the condition (1) satisfies the following condition (1a).

$$|ft/f_{1-3}t|<0.8 \quad (1a)$$

The condition (2) prescribes a focal length at the wide angle end of composite system from the first lens unit L1 to the third lens unit L3. The condition (2) makes both axial aberration by focusing and variation of off-axis aberration at the wide angle end small similar to the condition (1). Technical meaning of the condition (2) is similar to that of the condition (1). It is further preferred that the condition (2) satisfies the following condition (2a).

$$|fw/f_{1-3}w|<0.4 \quad (2a)$$

The condition (3) prescribes a lateral magnification at the wide angle end of the fourth lens unit L4. The condition (3) intends to successfully acquire afocal relationship between the third lens unit L3 and the fourth lens unit L4 and make variation of off-axis aberration by focusing small. When the condition (3) is deviated, afocal system between the third lens unit L3 and the fourth lens unit L4 collapses, and the incident height of the axial light by focusing widely changes, and variation of spherical aberration and off-axis chromatic aberration becomes large by changing the object distance. It is further preferred that the condition (3) satisfies the following condition (3a).

$$|β4w|<0.5 \quad (3a)$$

The condition (4) prescribes a lateral magnification at the telephoto end which it is preferred for the fourth lens unit L4 to satisfy similar to the condition (3). The condition (4) intends to close a space between the third lens unit L3 and the fourth lens unit L4 and make variation of off-axis aberration by focusing small. The technical feature of the condition (4) is the same as the condition (3). It is further preferred that the condition (4) satisfies the following condition (4a).

$$|4t|<0.5 \tag{4a}$$

The conditions (5) and (6) prescribe refractive powers of each lens unit so as to efficiently form afocal system between the third lens unit L3 and the fourth lens unit L4. The condition (5) prescribes a focal length at the wide angle end of composite system of the first lens unit L1 and the second lens unit L2. The condition (6) prescribes a focal length at the telephoto end of composite system of the first lens unit L1 and the second lens unit L2.

When the upper limit of the conditions (5) and (6) is deviated, the image side from the third lens unit L3 becomes too much convergent light, and additionally, if the lower limit thereof is deviated, the image side from the third lens unit L3 becomes too much divergent light. As a result, the incident height of the axial light widely changes during focusing, and spherical aberration and axial chromatic aberration become large by changing the object distance. It is further preferred that the conditions (5) and (6) satisfy the following conditions (5a) and (6a).

$$0.35<-f_{1-2}w/f3<1.2 \tag{5a}$$

$$0.50<-f_{1-2}t/f3<1.7 \tag{6a}$$

Next, it is preferred that the fourth lens unit L4 consists of one or two lenses since the lens unit becomes small and light, and quick focusing and wobbling are performed by easy configuration.

Condition (7) prescribes a ration between focusing movement amount Mft at the telephoto end of the fourth lens unit L4 and the variation amount Mz during zooming from the wide angle end to the telephoto end. Satisfying the condition (7) has advantage in miniaturization and high performance. When the upper limit of the condition (7) is deviated and a distance between the third lens unit L3 and the fourth lens unit L4 relative to focusing movement amount at the telephoto end become large, the entire system grows in size.

When the lower limit of the condition (7) is deviated, the movement amount of the fourth lens unit L4 during zooming becomes small and burden of variable magnification to each lens unit become large. As a result, aberration generated by each lens unit increases and it is difficult to acquire high optical performance. It is further preferred that the condition (7) satisfies the following condition (7a).

$$0.6<-Mz/Mft<1.2 \tag{7a}$$

Next, achieving an effect of zoom lens comprising a plurality of lens unit by easy lens construction, which is other object of the present invention, is described.

In the zoom lens having seven lens units disclosed in Japanese Paten Laid-Open No. 2004-317867, the third lens unit L3 has the strongest positive refractive power and the fifth lens unit L5 also has the same refractive power as the third lens unit L3. Therefore, since aberration variation becomes large when their lens unit moves, aberration variation needs to be small.

In the conditions (8) and (9), in the seven groups zoom lens of the above aberration arrangement, the refractive power of the fifth lens unit L5 has the strongest positive refractive power in the entire system. And they define the third lens unit L3 which is the object side of the fifth lens unit L5 and the seventh lens unit L7 which is the image side of the fifth lens unit L5 as lens unit having a certain weak refractive power. And their three lens units move as one (along the same locus) during zooming. As a result, the present invention intends to simplify lens construction and driving mechanism.

When the upper limit of the conditions (8) and (9) is deviated, the refractive power of the third lens unit L3 or the seventh lens unit L7 becomes strong, spherical aberration and comatic aberration increase in the intermediate zoom region, and correction of their aberrations is difficult. Additionally, the lower limit of the conditions (8) and (9) is deviated, an effect of aberration correction becomes weak and the entire system grows in size. It is further preferred that the conditions (8) and (9) satisfies the following conditions (8a) and (9a).

$$0.2<f5/f3<0.6 \tag{8a}$$

$$0.03<f5/f7<0.20 \tag{9a}$$

A zoom lens which is small and light in the entire system and has a preferable optical system in the entire zoom region and the entire object distance is acquired. Further, a zoom ratio and magnification at the close distance object are fully acquired, and a zoom lens which easily operates wobbling and has small and light focusing mechanism is acquired. Additionally, it is easy to achieve multi groups zoom lens by easy configuration.

Hereafter, the lens construction in each embodiment is described. A zoom lens according to the first embodiment includes a first lens unit L1 having a positive refractive power, a second lens unit L2 having a negative refractive power, a third lens unit L3 having a positive refractive power, a fourth lens unit L4 having a negative refractive power and a fifth lens unit L5 including the aperture stop SP and having a positive refractive power. Further, the zoom lens includes a six lens unit L6 having a negative refractive power and a seventh lens unit L7 having a positive refractive power, and in other words, the zoom lens according to the first embodiment is seven groups zoom lens of 2.8 zoom ratio.

During zooming from the wide angle end to the telephoto end, a distance between the first lens unit L1 and the second lens unit L2 becomes wide, a distance between the second lens unit L2 and the third lens unit L3 becomes short, a distance between the third lens unit L3 and the fourth lens unit L4 becomes wide and a distance between the fourth lens unit L4 and the fifth lens unit L5 becomes short. Each lens unit moves so that a distance between the fifth lens unit L5 and the sixth lens unit L6 becomes wide and sixth a distance between the sixth lens unit L6 and the seventh lens unit L7 becomes short.

Additionally, the fourth lens unit L4 performs focusing. The fourth lens unit L4 includes one lens, and as a result, small and light focus lens unit is achieved. Moreover, the refractive power of the composite system from the first lens unit L1 to the third lens unit L3 is weak, the conditions (1) and (2) are satisfied, and therefore, both variations of axial aberration and off-axis aberration by changing the object distance are small.

Next, each lateral magnification at the wide angle end and the telephoto end of the fourth lens unit L4 satisfies the conditions (3) and (4), respectively. Additionally, each focal lengths of the composite system of the first lens unit L1 and the second lens unit L2 at the wide angle end and the telephoto end are negative, and satisfy the conditions (5) and (6), respectively. As a result, at the wide angle end and the telephoto end, a space between the third lens unit L3 and the fourth lens unit L4 effectively becomes afocal system, variations of spherical aberration and axial chromatic aberration becomes small when the fourth lens unit L4 performs focusing, and miniaturization of the fourth lens unit L4 is achieved.

The fourth lens unit L4 moves to the object side during magnification from the wide angle end to the telephoto end so as to expand a distance between the third lens unit L3 and the fourth lens unit L4. In particular, small entire system is achieved since driving space of focusing of the fourth lens unit L4 is effectively used for magnification by satisfying the condition (7). Additionally, a relation among each focal length of the third lens unit L3, the fifth lens unit L5 and the seventh lens unit L7 satisfies the conditions (8) and (9). Therefore, it is easy to unite these lens units during zooming, and the seven groups zoom lens is achieved by easy lens construction.

In the second embodiment, zoom type such as the number of lens unit, a refractive power of each lens unit and movement condition of each lens unit during zooming is the same as the first embodiment. The focusing type of the second embodiment is the same as the first embodiment. A zoom lens according to the second embodiment is a seven groups zoom lens of 3.6 zoom ratio. The optical operation is the same as the first embodiment. In the third embodiment, zoom type and focusing type are the same as the first embodiment. A zoom lens according to the third embodiment is a seven groups zoom lens of 2.8 zoom ratio. The optical operation of each lens unit is the same as the first embodiment.

Each lens unit of each embodiment is from the most front surface of the optical system or a surface which changes a distance to a lens adjacent to front side by zooming to the most last surface of the optical system or a surface which changes a distance to a lens adjacent to rear side by zooming.

Next, embodiment applying the zoom lens illustrated in the first embodiment through the third embodiment to an image pickup apparatus is described in reference to FIG. 10. The image pickup apparatus of the present invention includes an interchangeable lens apparatus including a zoom lens, and a camera body detachably coupled to the interchangeable lens through a camera mount and an image pickup element which is received an optical image formed by the zoom lens and converts an electrical image signal.

FIG. 10 is a schematic diagram of a main part of a single lens reflex camera. In FIG. 10, reference 10 denotes an image pickup apparatus including any one zoom lens from the first embodiment to the third embodiment. A zoom lens 1 is hold by a lens barrel 2 which is a holding member. Reference 20 denotes a camera body, and the camera body 20 comprises a quick return mirror 3, a focusing screen 4 arranged on image forming position of the image pickup lens 10. Further, the camera body 20 comprises a penta dach prism 5 which converts an inverse image formed on the focusing screen 4 into an erected image and an ocular lens 6 to observe the erected image.

The quick return mirror 3 reflects a light flux from the image pickup optical system 10 upward. The focusing screen 4 is arranged at an image forming position of the image pickup optical system 10. The penta dach prism 5 converts a reverse image formed on the focusing screen 4 into an erected image. An observer observes the erected image by the ocular lens 6.

Reference 7 denotes a light sensitive surface, and a solid image pickup element (a photoelectric conversion element) such as a CCD sensor and a CMOS sensor receiving an image formed by the zoom lens and a silver-halide film are arranged on the light sensitive surface 7. The quick return mirror 3 is evacuated from a light path when taking an image and the image pickup optical system 10 forms an image on the light sensitive surface 7. The image pickup apparatus disclosed in the embodiment enjoys the effect described from the first embodiment through the third embodiment. Additionally, the zoom lens of the present invention is also able to be applied to a mirrorless camera which does not have a quick return mirror. Further, the zoom lens of the present invention is able to be applied to an image projection optical system for a projector.

Hereinafter, numerical examples 1 to 3 corresponding to the first embodiment to the third embodiment are indicated. i represents an optical surface number counted from the object side. In numerical examples, ri represents a curvature radius of an i-th lens surface in order from the object side, di represents a surface interval a lens thickness and an air gap of the i-th lens surface in order from the object side. ndi and vdi respectively represent a refractive index and an Abbe number of a lens material in order from the object side. BF represents a back focus. In aspherical shape, X axis is the optical axis direction, H axis is a direction perpendicular to the optical axis, a light direction of movement is a positive direction, r represents paraxial curvature radius, and A4, A6, A8 and A10 represent each aspherical coefficient. Then, the following condition is satisfied.

$$X = \frac{H^2/r}{1 + (1 - (H/r)^2)^{1/2}} + A4 \cdot H^4 + A6 \cdot H^6 + A8 \cdot H^8 + A10 \cdot H^{10}$$ [Number 1]

"e-X" of each aspheric coefficient represents "$\times 10^{-X}$". Additionally, in addition to specs such as a focal length and F number, a half angle of view of the entire system and an image height are maximum image height deciding a half angle of view, and the entire length of the lens is a distance from the first lens surface to the image surface. The back focus BF is a distance from the last surface (a diaphragm surface) to the image surface. Additionally, each lens unit data represents a focal length of each lens unit, a length on the optical axis, a front side principal position and a rear side principal position.

Additionally, a part where a gap d of each optical surface is variable changes during zooming, and surface separations according to the focal length are written in another table. Moreover, a part where the effective diameter is variable represents subdiaphragm changing the effective diameter during zooming and the effective diameters according to the focal length are written in another table. Calculate results of each condition based on lens data of numerical examples 1 through 3 described below are written in Table 1.

NUMERICAL EXAMPLE 1

| | | unit mm | | | |
|---|---|---|---|---|---|
| | | Surface data | | | |
| Surface number | r | d | nd | vd | effective diameter |
| 1 | 420.463 | 2.10 | 1.84666 | 23.8 | 65.22 |
| 2 | 95.813 | 5.11 | 1.77250 | 49.6 | 61.25 |
| 3 | 351.784 | 0.15 | | | 60.64 |
| 4 | 57.246 | 6.09 | 1.77250 | 49.6 | 56.91 |
| 5 | 136.919 | (variable) | | | 55.80 |
| 6* | 58.094 | 1.70 | 1.77250 | 49.6 | 36.97 |

-continued unit mm

| | | | | | |
|---|---|---|---|---|---|
| 7 | 14.657 | 10.37 | | | 25.97 |
| 8 | −40.221 | 1.20 | 1.74320 | 49.3 | 25.56 |
| 9 | 30.686 | 0.15 | | | 24.60 |
| 10 | 28.781 | 5.65 | 1.80518 | 25.4 | 24.75 |
| 11 | −113.693 | (variable) | | | 24.30 |
| 12 | 33.930 | 2.80 | 1.62588 | 35.7 | 18.84 |
| 13 | 2129.290 | (variable) | | | 18.90 |
| 14 | −33.536 | 1.00 | 1.90366 | 31.3 | 19.26 |
| 15 | −175.253 | (variable) | | | 19.94 |
| 16 | 70.815 | 4.17 | 1.59282 | 68.6 | 21.02 |
| 17 | −36.123 | 0.00 | | | 21.36 |
| 18 | ∞ | 2.00 | | | (variable) |
| 19(diaphragm) | ∞ | 0.00 | | | 21.17 |
| 20 | 23.286 | 6.52 | 1.49700 | 81.5 | 21.04 |
| 21 | −31.528 | 1.00 | 1.84666 | 23.8 | 20.19 |
| 22 | −81.401 | (variable) | | | 19.87 |
| 23 | 312.826 | 0.90 | 1.74950 | 35.3 | 17.46 |
| 24 | 20.030 | 2.35 | 1.84666 | 23.8 | 16.65 |
| 25 | 34.497 | (variable) | | | 16.14 |
| 26 | 94.739 | 2.60 | 1.85400 | 40.4 | 16.64 |
| 27* | 322.963 | | | | 17.24 |

Aspheric data

Sixth surface

K = 0.00000e+000   A4 = 5.55279e−006   A6 = −2.35870e−009
A8 = 1.71930e−012   A10 = −1.53153e−015

Twenty seventh surface

K = 0.00000e+000   A4 = 2.38976e−005   A6 = 2.59141e−009
A8 = 7.18431e−010   A10 = −3.88102e−012

Various data
Zoom ratio 2.84

| | Wide angle | intermediate | telephoto |
|---|---|---|---|
| Focal length | 24.30 | 35.10 | 69.00 |
| F number | 4.10 | 4.10 | 4.10 |
| Half angle of view (degree) | 41.68 | 31.65 | 17.41 |
| Image height | 21.64 | 21.64 | 21.64 |
| Lens overall length | 127.41 | 136.64 | 167.37 |
| BF | 39.26 | 46.14 | 63.02 |
| d5 | 0.90 | 12.00 | 34.37 |
| d11 | 18.37 | 9.63 | 1.10 |
| d13 | 4.17 | 4.52 | 6.51 |
| d15 | 3.39 | 3.04 | 1.05 |
| d22 | 1.20 | 2.44 | 3.95 |
| d25 | 4.25 | 3.02 | 1.50 |
| ea18 | 14.03 | 16.10 | 21.28 |

NUMERICAL EXAMPLE 2 unit mm

Surface data

| Surface number | r | d | nd | vd | effective diameter |
|---|---|---|---|---|---|
| 1 | 180.925 | 2.10 | 1.84666 | 23.8 | 61.60 |
| 2 | 55.595 | 7.69 | 1.77250 | 49.6 | 55.15 |
| 3 | 352.782 | 0.15 | | | 54.06 |
| 4 | 43.121 | 5.66 | 1.77250 | 49.6 | 49.40 |
| 5 | 84.513 | (variable) | | | 48.17 |
| 6* | 70.056 | 1.70 | 1.80400 | 46.6 | 37.04 |
| 7 | 16.026 | 10.05 | | | 26.91 |
| 8 | −39.110 | 1.20 | 1.63854 | 55.4 | 26.55 |
| 9 | 24.596 | 0.15 | | | 25.30 |
| 10 | 25.021 | 5.75 | 1.80518 | 25.4 | 25.35 |
| 11 | −506.806 | (variable) | | | 24.80 |
| 12 | 32.395 | 2.63 | 1.65412 | 39.7 | 16.00 |
| 13 | −181.832 | (variable) | | | 15.86 |
| 14 | −28.587 | 1.00 | 1.88300 | 40.8 | 14.94 |
| 15 | −212.081 | (variable) | | | 14.95 |
| 16 | 67.847 | 3.30 | 1.59282 | 68.6 | 16.04 |
| 17 | −29.192 | 2.00 | | | 16.06 |
| 18(diaphragm) | ∞ | 0.00 | | | 15.14 |
| 19 | 21.558 | 4.47 | 1.49700 | 81.5 | 15.14 |
| 20 | −37.856 | 1.00 | 1.84666 | 23.8 | 14.44 |
| 21 | 1820.301 | (variable) | | | 14.20 |
| 22 | 148.561 | 0.90 | 1.85026 | 32.3 | 13.57 |
| 23 | 15.592 | 2.43 | 1.84666 | 23.8 | 13.16 |
| 24 | 38.466 | (variable) | | | 13.00 |
| 25 | 54.318 | 2.55 | 1.85400 | 40.4 | 15.22 |
| 26* | 77.929 | | | | 15.76 |

Aspheric data

Sixth surface

K = 0.00000e−000   A4 = 3.51159e−006   A6 = −8.11967e−010
A8 = −3.46518e−012   A10 = 5.42938e−015

Twenty-Sixth surface

K = 0.00000e+000   A4 = 2.15560e−005   A6 = 5.41163e−008
A8 = −5.95020e−010   A10 = 3.76132e−012

Various data
Zoom ratio 3.64

| | Wide angle | intermediate | telephoto |
|---|---|---|---|
| Focal length | 28.30 | 35.10 | 102.99 |
| F number | 3.82 | 4.23 | 5.83 |
| Half angle of view (degree) | 37.40 | 31.65 | 11.86 |
| Image height | 21.64 | 21.64 | 21.64 |
| Lens overall length | 128.40 | 129.93 | 168.35 |
| BF | 39.78 | 44.84 | 65.23 |
| d5 | 0.90 | 2.84 | 30.18 |
| d11 | 15.87 | 10.40 | 1.10 |
| d13 | 4.30 | 4.91 | 10.53 |
| d15 | 7.28 | 6.67 | 1.05 |
| d21 | 2.27 | 2.94 | 4.05 |
| d24 | 3.28 | 2.61 | 1.50 |

NUMERICAL EXAMPLE 3 unit mm

Surface data

| Surface number | r | d | nd | vd | effective diameter |
|---|---|---|---|---|---|
| 1 | 800.000 | 2.10 | 1.84666 | 23.8 | 66.83 |
| 2 | 107.042 | 7.05 | 1.77250 | 49.6 | 64.45 |
| 3 | −749.653 | 0.15 | | | 63.94 |
| 4 | 47.959 | 5.19 | 1.77250 | 49.6 | 56.46 |
| 5 | 72.865 | (variable) | | | 55.03 |
| 6* | 55.163 | 1.70 | 1.77250 | 49.6 | 35.32 |
| 7 | 14.641 | 9.57 | | | 25.20 |
| 8 | −41.478 | 1.20 | 1.77250 | 49.6 | 24.70 |
| 9 | 27.261 | 0.15 | | | 23.54 |
| 10 | 26.421 | 5.50 | 1.80518 | 25.4 | 23.65 |
| 11 | −133.555 | (variable) | | | 23.16 |
| 12 | 38.503 | 2.32 | 1.69895 | 30.1 | 17.59 |
| 13 | 202.785 | (variable) | | | 17.69 |
| 14 | −32.140 | 1.00 | 1.91082 | 35.3 | 18.60 |
| 15 | −96.963 | (variable) | | | 19.32 |
| 16 | 69.591 | 3.57 | 1.59282 | 68.6 | 20.57 |
| 17 | −50.249 | 0.00 | | | 20.94 |
| 18 | ∞ | 2.00 | | | (variable) |
| 19(diaphragm) | ∞ | 0.00 | | | 21.22 |
| 20 | 29.953 | 5.96 | 1.59282 | 68.6 | 21.41 |

-continued unit mm

| 21 | −29.999 | 1.00 | 1.84666 | 23.8 | 20.94 |
|---|---|---|---|---|---|
| 22 | −112.952 | 0.15 | | | 20.72 |
| 23 | 55.751 | 2.83 | 1.59282 | 68.6 | 20.22 |
| 24 | −238.256 | (variable) | | | 19.64 |
| 25 | 206.330 | 1.86 | 1.84666 | 23.8 | 16.91 |
| 26 | −87.074 | 0.90 | 1.88300 | 40.8 | 16.44 |
| 27 | 37.675 | (variable) | | | 15.80 |
| 28 | 269.291 | 2.17 | 1.85400 | 40.4 | 16.73 |
| 29* | 7171.602 | | | | 17.18 |

Aspheric data

Sixth surface

K = 0.00000e+000   A4 = 4.96610e−006   A6 = −1.24165e−009
A8 = −6.68122e−012   A10 = 6.01974e−015

Twenty-Ninth surface

K = 0.00000e+000   A4 = 2.56595e−005   A6 = −1.64727e−008
A8 = 9.85243e−010   A10 = −5.17364e−012

Various data
Zoom ratio 2.84

| | Wide angle | intermediate | telephoto |
|---|---|---|---|
| Focal length | 21.30 | 35.10 | 69.00 |
| F number | 4.10 | 4.10 | 4.10 |
| Half angle of view (degree) | 41.68 | 31.65 | 17.41 |
| Image height | 21.64 | 21.64 | 21.64 |
| Lens overall length | 127.40 | 137.15 | 167.35 |
| BF | 39.20 | 45.86 | 61.09 |
| d5 | 0.90 | 12.00 | 34.97 |
| d11 | 17.12 | 9.11 | 1.10 |
| d13 | 4.15 | 4.66 | 6.75 |
| d15 | 3.65 | 3.14 | 1.05 |
| d24 | 1.23 | 2.38 | 4.10 |
| d27 | 4.79 | 3.64 | 1.91 |
| ea18 | 14.23 | 16.24 | 21.04 |

TABLE 1

| | CONDITION | Numerical Example 1 | Numerical Example 2 | Numerical Example 3 |
|---|---|---|---|---|
| | fw | 24.300 | 28.300 | 24.300 |
| | ft | 69.000 | 102.985 | 69.000 |
| | β4W | −0.032 | −0.277 | 0.183 |
| | β4T | 0.204 | −0.077 | 0.357 |
| | $f_{1-3}w$ | 721.629 | 98.633 | −114.200 |
| | $f_{1-3}t$ | −161.583 | 647.663 | −88.149 |
| | $f_{1-2}w$ | −27.276 | −30.527 | −25.807 |
| | $f_{1-2}t$ | −39.259 | −55.603 | −38.377 |
| | f3 | 55.061 | 42.241 | 67.605 |
| | f5 | 22.965 | 23.540 | 20.942 |
| | f7 | 156.166 | 199.998 | 327.584 |
| | Mz | 2.339 | 6.233 | 2.601 |
| | Mft | −2.906 | −5.479 | −3.556 |
| (1) | $|ft/f_{1-3}t|$ | 0.427 | 0.159 | 0.783 |
| (2) | $|f_w/f_{1-3}w|$ | 0.034 | 0.287 | 0.213 |
| (3) | $|β4W|$ | 0.032 | 0.277 | 0.183 |
| (4) | $|β4T|$ | 0.204 | 0.077 | 0.357 |
| (5) | $-f_{1-2}w/f3$ | 0.495 | 0.723 | 0.382 |
| (6) | $-f_{1-2}t/f3$ | 0.713 | 1.316 | 0.568 |
| (7) | −Mz/Mft | 0.805 | 1.138 | 0.731 |
| (8) | f5/f3 | 0.417 | 0.557 | 0.310 |
| (9) | f5/f7 | 0.147 | 0.118 | 0.064 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-238823, filed Oct. 30, 2012, which is hereby incorporated by reference herein in its entirety.

What is claimed is:

1. A zoom lens comprising:
in order from an object side to an image side,
a first lens unit having a positive refractive power;
a second lens unit having a negative refractive power;
a third lens unit having a positive refractive power;
a fourth lens unit having a negative refractive power;
a fifth lens unit having a positive refractive power;
a sixth lens unit having a negative refractive power; and
a seventh lens unit having a positive refractive power,
wherein distances between adjacent lens units change during zooming so that a distance between the fourth lens unit and the fifth lens unit at a telephoto end is shorter than the distance between the fourth lens unit and the fifth lens unit at a wide angle end, and a distance between the fifth lens unit and the sixth lens unit at the telephoto end is longer than the distance between the fifth lens unit and the sixth lens unit at the wide angle end, and
wherein the fourth lens unit moves during focusing.

2. The zoom lens according to claim 1, wherein the following condition is satisfied:

$$|ft/f_{1-3t}|<0.9$$

where ft represents a focal length of an entire system at the telephoto end, and $f_{1-3t}$ represents a focal length of a composite system from the first lens unit to the third lens unit at the telephoto end.

3. The zoom lens according to claim 1, wherein the following condition is satisfied:

$$|fw/f_{1-3w}|<0.6$$

where fw represents a focal length of an entire system at the wide angle end, and a $f_{1-3w}$ represents a focal length represents a focal length of a composite system from the first lens unit to the third lens unit at the wide angle end.

4. The zoom lens according to claim 1, wherein the following condition is satisfied:

$$|β4w|<1.0$$

where β4w represents a lateral magnification of the fourth lens unit at the wide angle end.

5. The zoom lens according to claim 1, wherein the following condition is satisfied:

$$|β4t|<1.0$$

where β4t represents a lateral magnification of the fourth lens unit at the telephoto end.

6. The zoom lens according to claim 1, wherein the following condition is satisfied:

$$0.3<-f_{1-2w}/f3<2.0$$

where $f_{1-2w}$ represents a focal length of a composite system of the first lens unit and the second lens unit at the wide angle end, and f3 represents a focal length of the third lens unit.

7. The zoom lens according to claim 1, wherein the following condition is satisfied:

$$0.3<-f_{1-2t}/f3<2.0$$

where $f_{1-2t}$ represents a focal length of a composite system of the first lens unit and the second lens unit at the telephoto end, and f3 represents a focal length of the third lens unit.

8. The zoom lens according to claim 1, wherein the fourth lens unit consists of one or two lenses.

9. The zoom lens according to claim 1, wherein the following condition is satisfied:

$0.5<-Mz/Mft<1.3$ where Mft represents a movement amount of the fourth lens unit during focusing from an object at infinity to a close distance object at the telephoto end, and Mz represents a variation amount of a distance between the third lens unit and the fourth lens unit during zooming from the wide angle end to the telephoto end.

10. A zoom lens comprising:
in order from an object side to an image side,
a first lens unit having a positive refractive power;
a second lens unit having a negative refractive power;
a third lens unit having a positive refractive power;
a fourth lens unit having a negative refractive power;
a fifth lens unit having a positive refractive power;
a sixth lens unit having a negative refractive power; and
a seventh lens unit having a positive refractive power,
wherein the third lens unit, the fifth lens unit, and the seventh lens unit move along the same locus during zooming so as to change a distance between adjacent lens units, and
wherein the following conditions are satisfied:

$0.2<f5/f3<0.8$ $0.02<f5/f7<0.30$ where f3 represents a focal length of the third lens unit, f5 is a focal length of the fifth lens unit, and f7 represents a focal length of the seventh lens unit.

11. The zoom lens according to claim 1, wherein the first lens unit and the third lens unit through the seventh lens unit move toward the object side and the second lens unit moves along a locus convex toward the image side during zooming from the wide angle end to the telephoto end.

12. The zoom lens according to claim 10, wherein the first lens unit and the third lens unit through the seventh lens unit move toward the object side and the second lens unit moves along a locus convex toward the image side during zooming from a wide angle end to a telephoto end.

13. The zoom lens according to claim 1, wherein each lens unit moves during zooming so that a distance between the first lens unit and the second lens unit at the telephoto end is longer than the distance between the first lens unit and the second lens unit at the wide angle end, a distance between the second lens unit and the third lens unit at the telephoto end is shorter than the distance between the second lens unit and the third lens unit at the wide angle end, a distance between the third lens unit and the fourth lens unit at the telephoto end is longer than the distance between the third lens unit and the fourth lens unit at the wide angle end, a distance between the fourth lens unit and the fifth lens unit at the telephoto end is shorter than the distance between the fourth lens unit and the fifth lens unit at the wide angle end, a distance between the fifth lens unit and the sixth lens unit at the telephoto end is longer than the distance between the fifth lens unit and the sixth lens unit at the wide angle end, and a distance between the sixth lens unit and the seventh lens unit at the telephoto end is shorter than the distance between the sixth lens unit and the seventh lens unit at the wide angle end.

14. The zoom lens according to claim 10, wherein each lens unit moves during zooming so that a distance between the first lens unit and the second lens unit at a telephoto end is longer than the distance between the first lens unit and the second lens unit at a wide angle end, a distance between the second lens unit and the third lens unit at the telephoto end is shorter than the distance between the second lens unit and the third lens unit at the wide angle end, a distance between the third lens unit and the fourth lens unit at the telephoto end is longer than the distance between the third lens unit and the fourth lens unit at the wide angle end, a distance between the fourth lens unit and the fifth lens unit at the telephoto end is shorter than the distance between the fourth lens unit and the fifth lens unit at the wide angle end, a distance between the fifth lens unit and the sixth lens unit at the telephoto end is longer than the distance between the fifth lens unit and the sixth lens unit at the wide angle end, and a distance between the sixth lens unit and the seventh lens unit at the telephoto end is shorter than the distance between the sixth lens unit and the seventh lens unit at the wide angle end.

15. An image pickup apparatus comprising:
a zoom lens; and
an image pickup element configured to take an image formed by the zoom lens,
wherein the zoom lens comprises, in order from an object side to an image side, a first lens unit having a positive refractive power, a second lens unit having a negative refractive power, a third lens unit having a positive refractive power, a fourth lens unit having a negative refractive power, a fifth lens unit having a positive refractive power, a sixth lens unit having a negative refractive power and a seventh lens unit having a positive refractive power,
wherein distances between adjacent lens units change during zooming so that a distance between the fourth lens unit and the fifth lens unit at a telephoto end is shorter than the distance between the fourth lens unit and the fifth lens unit at a wide angle end, and a distance between the fifth lens unit and the sixth lens unit at the telephoto end is longer than the distance between the fifth lens unit and the sixth lens unit at the wide angle end, and
wherein the fourth lens unit moves during focusing.

16. An image pickup apparatus comprising:
a zoom lens; and
an image pickup element configured to take an image formed by the zoom lens,
wherein the zoom lens comprises, in order from an object side to an image side, a first lens unit having a positive refractive power, a second lens unit having a negative refractive power, a third lens unit having a positive refractive power, a fourth lens unit having a negative refractive power, a fifth lens unit having a positive refractive power, a sixth lens unit having a negative refractive power and a seventh lens unit having a positive refractive power,
wherein the third lens unit, the fifth lens unit and the seventh lens unit move along the same locus during zooming so as to change distances between adjacent lens units, and
wherein the following conditions are satisfied:

$0.2<f5/f3<0.8$ $0.02<f5/f7<0.30$ where f3 represents a focal length of the third lens unit, f5 is a focal length of the fifth lens unit, and f7 represents a focal length of the seventh lens unit.

* * * * *